United States Patent [19] … [11] Patent Number: 4,890,542
Miller et al. … [45] Date of Patent: Jan. 2, 1990

[54] HIGH-PRESSURE-FLUID MACHINE, A SEAL

[75] Inventors: Bernard F. Miller, Corning, N.Y.; John A. Sawyer, Trout Run, Pa.; Wayne F. Wehber, Horseheads, N.Y.

[73] Assignee: Ingersoll-Rand Company, Woodcliff Lake, N.J.

[21] Appl. No.: 240,646

[22] Filed: Sep. 6, 1988

[51] Int. Cl.⁴ ............................................. F16J 1/06
[52] U.S. Cl. .................................. 92/194; 92/193; 92/201; 277/75; 277/102; 277/116
[58] Field of Search ............. 92/51, 52, 53, 60, 60.5, 92/62, 63, 76, 81, 83, 167, 193, 194, 201, 202–207, 247, 250; 277/75, 116, 203, 114, 102, 98, 99, 100

[56] References Cited

U.S. PATENT DOCUMENTS

| 1,346,652 | 7/1920 | Hinshaw et al. | 92/247 |
| 1,945,151 | 6/1931 | Marsh | 92/247 |
| 3,303,757 | 2/1967 | Ward | 277/75 |
| 3,549,155 | 12/1970 | Ward | 277/75 |
| 4,170,363 | 10/1979 | Bergman | 277/116 |
| 4,352,499 | 10/1982 | Foster | 277/102 |
| 4,582,329 | 4/1986 | Stalph | 277/116 |

FOREIGN PATENT DOCUMENTS

| 854611 | 9/1952 | Fed. Rep. of Germany | 92/247 |
| 3010829 | 10/1981 | Fed. Rep. of Germany | 277/102 |
| 3204553 | 8/1983 | Fed. Rep. of Germany | 277/102 |
| 621058 | 3/1927 | France | 277/116 |
| 1274512 | 9/1961 | France | 92/247 |
| 212136 | 9/1966 | Sweden | 277/102 |
| 788253 | 12/1957 | United Kingdom | 92/247 |

Primary Examiner—Randall L. Green
Assistant Examiner—Thomas Denion
Attorney, Agent, or Firm—Bernard J. Murphy

[57] ABSTRACT

The seal, for use especially in non-lubricated, high-pressure, as compressors, in a one-piece, continuous sleeve which envelopes a reciprocable piston for sealing against the piston, or against the cylinder in which the piston translates. One end of the sleeve effects the sealing engagement, and the other end is spring-loaded to maintain the engagement. During operation of the compressor, or the like, it is the high-pressure gas which urges the seal into sealing engagement.

11 Claims, 2 Drawing Sheets

HIGH-PRESSURE-FLUID MACHINE, A SEAL

This invention pertains to fluid seals, i.e., seals for containing fluids, and in particular to such seals for containing a high-pressure fluid, such as gas, in non-lubricated, high pressure machines, for example: non-lubricated, high pressure, gas compressors.

Compressors pumping air and other gases at pressures over 1000 psi require special seals for non lubricated serivce. One widely used seal design is a sleeve type seal (U.S. Pat. No. 3,549,155, issued to John R. Ward, on 22 Dec. 1970, for a "Helically Cut Sleeve Seal") which is made of special plastic material and is actuated by the pressure of the gas being compressed to seal. Flaring of the seal end is required before installation. Very often in many applications this seal needs re-flaring after the compressor is shutdown especially if the shutdown is for a long period. Otherwise the seal leaks and will not re-seal. To overcome this problem the seal must be energized by a mechanical means to create initial contact of the seal to the bore until pressure of compression takes over. It is an object of this invention to show that a compression spring installed behind this seal can perform that function repeatedly and extend the life of the seal. Particularly, it is an object of this invention to set forth, in a high-pressure-fluid machine, a seal, comprising a cylinder, having an inner, bore surface; and a piston, having an outer, cylindrical surface; wherein said piston is reciprocably disposed in said cylinder; a seal, interposed between said piston and said cylinder, for sealing agaisnt one of said surfaces; wherein said seal comprises one-piece, continuous sleeve, having a sealing end, and an opposite, bearing-surface end; and means confined within said cylinder, and engaged with said bearing-surface end of said seal, for urging said sealing end of said seal into sealing engagement with said one surface.

Further objects of this invention, as well as the novel features thereof, will become more apparent by reference to the following description, taken in conjunction with the accompanying figures, in which.

Figure 1:
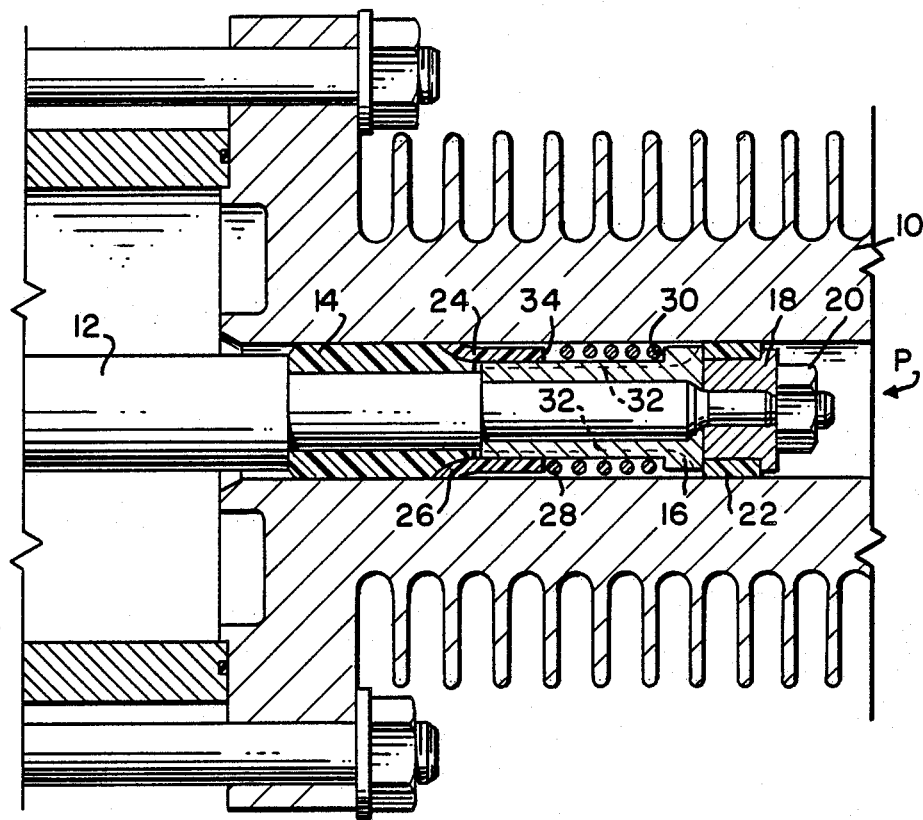
FIG. 1 is a cross-sectional view, taken along the axis of a portion of a high-pressure gas compressor, of a first embodiment of the invention.

As shown in FIG. 1, a typical cylinder 10 contains piston rod 12 which has mounted on it a floating, plastic follower 14, a steel guide 16 and spacer 18 which are clamped together by threaded nut 20. Installed on spacer 18 is a rider band 22 of plastic material. The plastic follower 14 is used to guide the sealing end of a seal 24 to seal against the cylinder bore surface when actuated by high gas pressure "P". Whilst such pressure is applied to the other, bearing surface end of the seal 24, this sealing contact is maintained over a period of time at area 26 until the seal 24 wears so short that it cannot conform. However, if this teflon seal 24 loses its memory, or if it was improperly flared initially, and the compressor is shutdown, it requires compression spring 28 to initially energize the seal 24 to make initial sealing contact prior to reaching proper pressure "P". The small spring force required, relative to the pressure "P" does not accelerate wear but rather prolongs it. Other types of energizers or types of springs can also be used, but the compression spring 28 can allow for a greater length of wear due to its overall compression length.

The spring 28 is set against a shoulder 30 formed on the steel guide 16. The guide 16 has a plurality of flutes or grooves 32, axially-extending, formed in the outer surface thereof. The same are provided to enable high pressure gas ("P") to impinge on the bearing-surface end 34 of the seal 24 to energize it (i.e., force the opposite, sealing end into sealing engagement in area 26).

Figure 2:
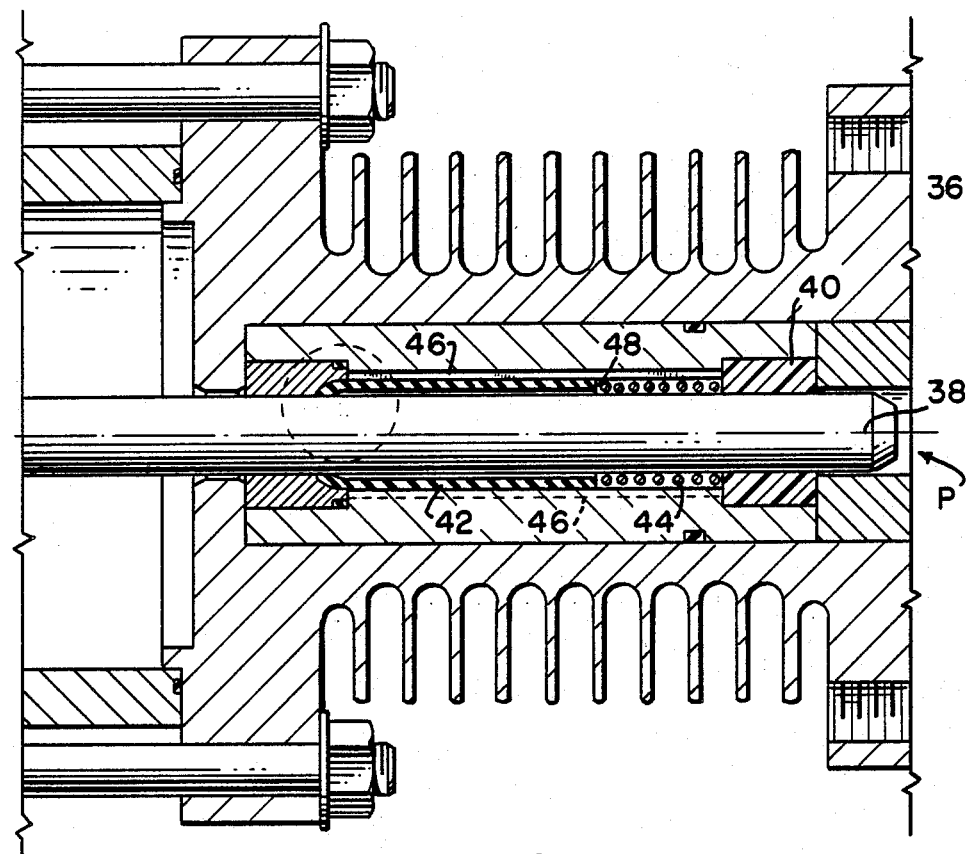
FIG. 2, is a cross-sectional view, like that of FIG. 1, of an alternative embodiment of the invention.
Figure 2A:
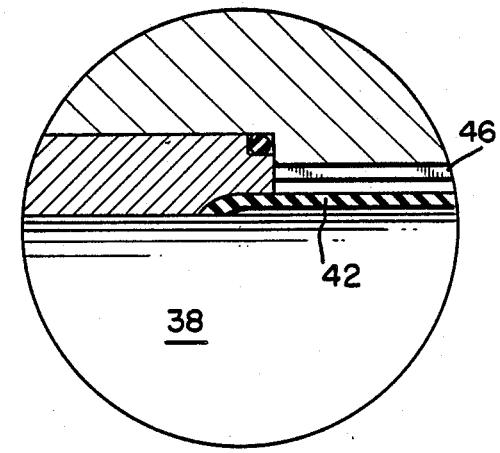
FIG. 2A is an enlargement of the detail in the circled area of FIG. 2.

Whereas, in FIG. 1 the seal 24 is carried by the piston, FIG. 2 and 2A disclose an alternative embodiment in which the seal is mounted in the cylinder.

Cylinder 36 receives a plunger-type piston 38 therein, and the latter is guided in its reciprocation by a plastic annulus 40 which is nested in the cylinder 36. The seal 42 is biased into sealing engagement with the piston 38 by a spring 44 which is set against the annulus 40. Here too, flutes or grooves 46 are formed in the bore of the cylinder to permit the high-pressure gas ("P") to address the bearing-surface end 48 of the seal 42.

While we have described our invention in connection with specific embodiments of the invention, it is to be clearly understood that this is done only by way of example, and not as a limitation to the scope of our invention, as set forth in the objects thereof, and in the appended claims

We claim:

1. In a high-pressure-fluid machine, a seal, comprising:

a cylinder, having an inner, bore surface; and
    a piston, having an outer, cylindrical surface; wherein
    said piston is reciprocably disposed in said cylinder; and
    a seal interposed between said piston and said cylinder, for sealing against one of said surfaces; wherein
    said seal comprises a one-piece, continuous sleeve;
    said seal has (a) a sealing surface at only one end thereof, and (b) a bearinhg surface at an end thereof which is opposite said one end; and
    means confined within said cylinder, and engaged with said bearing surface end of said seal, for urging said one sealing end of said seal into sealing engagement with said one surface; wherein
    said piston has a shoulder formed thereon;
    said urging means comprises a compression spring in envelopment of said piston; and
    said spring has an end thereof engaged with said shoulder.

2. The invention, according to claim 1, wherein:
    said shoulder, spring, and said seal, excepting said sealing end thereof, are spaced apart from said bore surface of said cylinder.

3. The invention, according to claim 1, wherein:
    said cylinder has an annulus nested therein;
    said urging means comprises a compression spring in envelopment of said piston; and
    said spring has an end thereof engaged with said annulus.

4. In a high-pressure-fluid machine, a seal, comprising;
    a cylinder, having an inner, bore surface; and
    a piston, having an outer, cylindrical surface; wherein
    said piston is reciprocably disposed in said cylinder; and
    a seal interposed between said piston and said cylinder, for sealing against one of said surfaces; wherein said seal comprises a one-piece, continuous sleeve;
said seal has (a) a sealing surface at only one end thereof, and (b) a bearing surface at an end thereof which is opposite said one end; and
means confined within said cylinder, and engaged with said bearing surface end of said seal, for urging said one sealing end of said seal into sealing engagement with said one surface; wherein
one of said surfaces has means formed therein for accommodating a conduct of pressured fluid along said piston for impingement of such fluid with said bearing-surface end of said seal.

5. The invention, according to claim 4, wherein:
said urging means and said seal, excepting said sealing end thereof are spaced apart from said bore surface of said cylinder.

6. The invention, according to claim 4, wherein: said fluid-accommodating means comprises a channel formed in said one surface.

7. The invention, according to claim 6, wherein:
said outer cylindrical surface of said piston is said one surface.

8. The invention, according to claim 6, wherein:
said inner, bore surface of said cylinder is said one surface.

9. The invention, according to claim 4, further including:
an annulus, in envelopment of said piston, for guiding said piston in reciprocation.

10. The invention, according to claim 9, wherein:
said annulus is carried by said piston.

11. The invention according to claim 9, wherein:
said annulus is nested in said cylinder.

* * * * *